United States Patent
Oya

(10) Patent No.: US 10,872,422 B2
(45) Date of Patent: Dec. 22, 2020

(54) INFORMATION PROCESSING DEVICE, IMAGING DEVICE, INFORMATION PROCESSING METHOD, AND STORAGE MEDIUM

(71) Applicant: CANON KABUSHIKI KAISHA, Tokyo (JP)

(72) Inventor: Takashi Oya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/420,945

(22) Filed: May 23, 2019

(65) Prior Publication Data

US 2019/0370976 A1 Dec. 5, 2019

(30) Foreign Application Priority Data

May 30, 2018 (JP) .................. 2018-103820

(51) Int. Cl.
*G06T 7/20* (2017.01)
*G06T 7/70* (2017.01)
(Continued)

(52) U.S. Cl.
CPC .................. *G06T 7/20* (2013.01); *G06T 7/70* (2017.01); *G07C 1/10* (2013.01); *G06T 2207/30196* (2013.01); *G06T 2207/30242* (2013.01)

(58) Field of Classification Search
CPC ... G06T 7/20; G06T 7/70; G06T 2207/30196; G06T 2207/30242; G06T 2207/30232; G07C 1/10; G06K 9/0771; G06K 9/00778
See application file for complete search history.

(56) References Cited

U.S. PATENT DOCUMENTS 5,953,055 A * 9/1999 Huang ............... G06K 9/00228
348/149
9,245,247 B2 * 1/2016 Raja .................. G06Q 10/0631
(Continued)

FOREIGN PATENT DOCUMENTS

JP 2004-287752 A 10/2004
JP 2005-216217 A 8/2005
(Continued)

OTHER PUBLICATIONS

The above patent documents were cited in a European Search Report dated Nov. 4, 2019, which is enclosed, that issued in the corresponding European Patent Application No. 19175548.7.

*Primary Examiner* — Alexander Gee
(74) *Attorney, Agent, or Firm* — Cowan, Liebowitz & Latman, P.C.

(57) ABSTRACT

An information processing device that can accurately estimate the waiting time in a queue even if the queue is extended is provided. The information processing device includes a calculator that performs a first calculation process for calculating the waiting time of a subject person in the queue on the basis of the time when the subject person detected by a first detector passes through a first line and the time when the subject person detected by a second detector passes through a second line or a second calculation process for calculating the waiting time of a subject person in the queue on the basis of the time when the number of people lined up in the queue including the subject person is acquired by the acquirer and the time when the subject person detected by the second detector passes through the second line.

8 Claims, 9 Drawing Sheets

(51) Int. Cl.
*G07C 1/10* (2006.01)
*G07C 11/00* (2006.01)
*G06K 9/00* (2006.01)

(56) References Cited

U.S. PATENT DOCUMENTS

| | | | |
|---|---|---|---|
| 10,417,670 B1* | 9/2019 | Sulejmani | H04W 4/021 |
| 2006/0269103 A1* | 11/2006 | Brown | G06K 9/00778 |
| | | | 382/103 |
| 2009/0034846 A1* | 2/2009 | Senior | G06K 9/00778 |
| | | | 382/190 |
| 2009/0063205 A1* | 3/2009 | Shibasaki | G07C 11/00 |
| | | | 705/5 |
| 2013/0223678 A1* | 8/2013 | Brunetti | G06K 9/00778 |
| | | | 382/103 |
| 2015/0324647 A1* | 11/2015 | Wuethrich | G06K 9/00369 |
| | | | 382/103 |
| 2018/0060672 A1 | 3/2018 | Takeda | |
| 2018/0061161 A1 | 3/2018 | Nagao et al. | |
| 2018/0144198 A1 | 5/2018 | Funagi | |
| 2018/0240176 A1* | 8/2018 | Cronin | H04L 67/22 |
| 2018/0268391 A1* | 9/2018 | Hayashi | G07G 1/0036 |
| 2019/0325460 A1* | 10/2019 | Klima | G06T 5/002 |

FOREIGN PATENT DOCUMENTS

| | | |
|---|---|---|
| JP | 2007-317052 A | 12/2007 |
| JP | 2008-217289 A | 9/2008 |
| WO | 2016/004304 A1 | 1/2016 |

\* cited by examiner

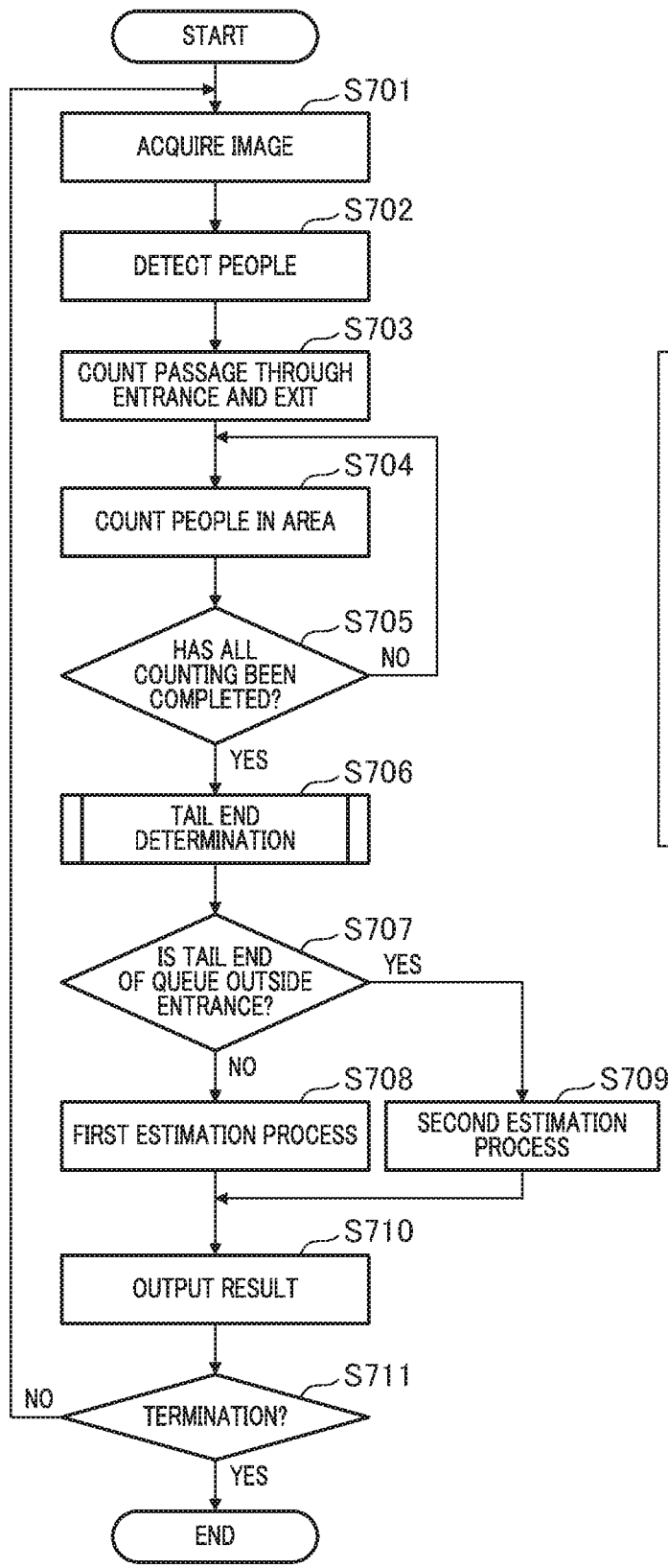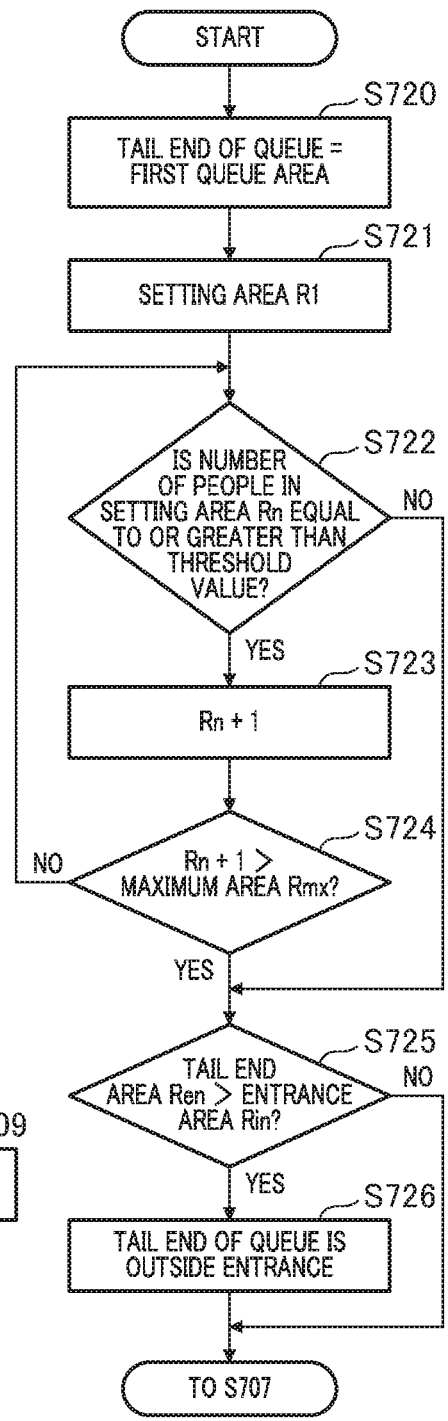

INFORMATION PROCESSING DEVICE, IMAGING DEVICE, INFORMATION PROCESSING METHOD, AND STORAGE MEDIUM

BACKGROUND OF THE INVENTION

Field of the Invention

The present invention relates to an information processing device, an imaging device, an information processing method, and a storage medium.

Description of the Related Art

Queues of users occur at facilities such as station buildings, airports, retail stores, and banks. There are technologies for counting people waiting in such a queue and estimating the waiting time from a captured image of the queue.

Regarding the counting of people in a queue, in Japanese Patent Laid-Open No. 2008-217289, the number of people entering a room and the number of people exiting the room are measured from the movement directions of people and the number of people who have remained in the room is obtained from the difference between the measured numbers of people entering and exiting the room. In Japanese Patent Laid-Open No. 2004-287752, people entering or leaving a monitoring area are detected from images of a plurality of cameras capturing an entrance and an exit of the monitoring area to obtain the number of people in the monitoring area and further the number of people in the monitoring area is corrected using an image of a camera capturing the entire monitoring area. In Japanese Patent Laid-Open No. 2005-216217, a queue is photographed with a camera provided above the queue and the number of people is measured and displayed through image processing. Regarding the estimation of the waiting time in a queue, in Japanese Patent Laid-Open No. 2007-317052, people forming a queue are counted by a background subtraction method to obtain the number of people in the queue and then the waiting time is estimated.

The methods of Japanese Patent Laid-Open Nos. 2008-217289 and 2004-287752 measure the number of people within a predetermined area on the basis of observation of people passing through the entrance and exit of the area. Therefore, the measurement accuracy of the number of waiting people may be reduced if the queue extends beyond the entrance. On the other hand, the methods of Japanese Patent Laid-Open Nos. 2005-216217 and 2007-317052 can cope with such extension of the tail end of the queue beyond the entrance since they use the measured length of the queue. However, use of the length of the queue may reduce the estimation accuracy of the waiting time.

SUMMARY OF THE INVENTION

It is an object of the present invention to provide an information processing device that can accurately estimate the waiting time in a queue even if the queue is extended.

An information processing device according to the present invention includes an acquirer configured to acquire the number of people lined up in a queue from an image, a first detector configured to detect that a person has passed through a first line which is a line through which the person passes when entering a first area which is an area including a head of the queue, a second detector configured to detect that a person has passed through a second line which is a line through which the person passes when exiting the first area and which corresponds to the head of the queue, and a calculator configured to perform a first calculation process for calculating a waiting time of a subject person in the queue on the basis of a time when the subject person detected by the first detector passes through the first line and a time when the subject person detected by the second detector passes through the second line or a second calculation process for calculating a waiting time of a subject person in the queue on the basis of a time when the number of people lined up in the queue including the subject person is acquired by the acquirer and a time when the subject person detected by the second detector passes through the second line, wherein the calculator is configured to perform the first calculation process if a location of a tail end of the queue is closer to the head of the queue than the first line is and to perform the second calculation process if the location of the tail end of the queue is not closer to the head of the queue than the first line is.

Further features of the present invention will become apparent from the following description of exemplary embodiments with reference to the attached drawings.

BRIEF DESCRIPTION OF THE DRAWINGS

FIGS. 7A and 7B are flowcharts showing exemplary processing of the information processing device according to the first embodiment.

DESCRIPTION OF THE EMBODIMENTS

Hereinafter, preferred embodiments of the present invention will be described in detail with reference to the drawings.

First Embodiment

Figure 1:
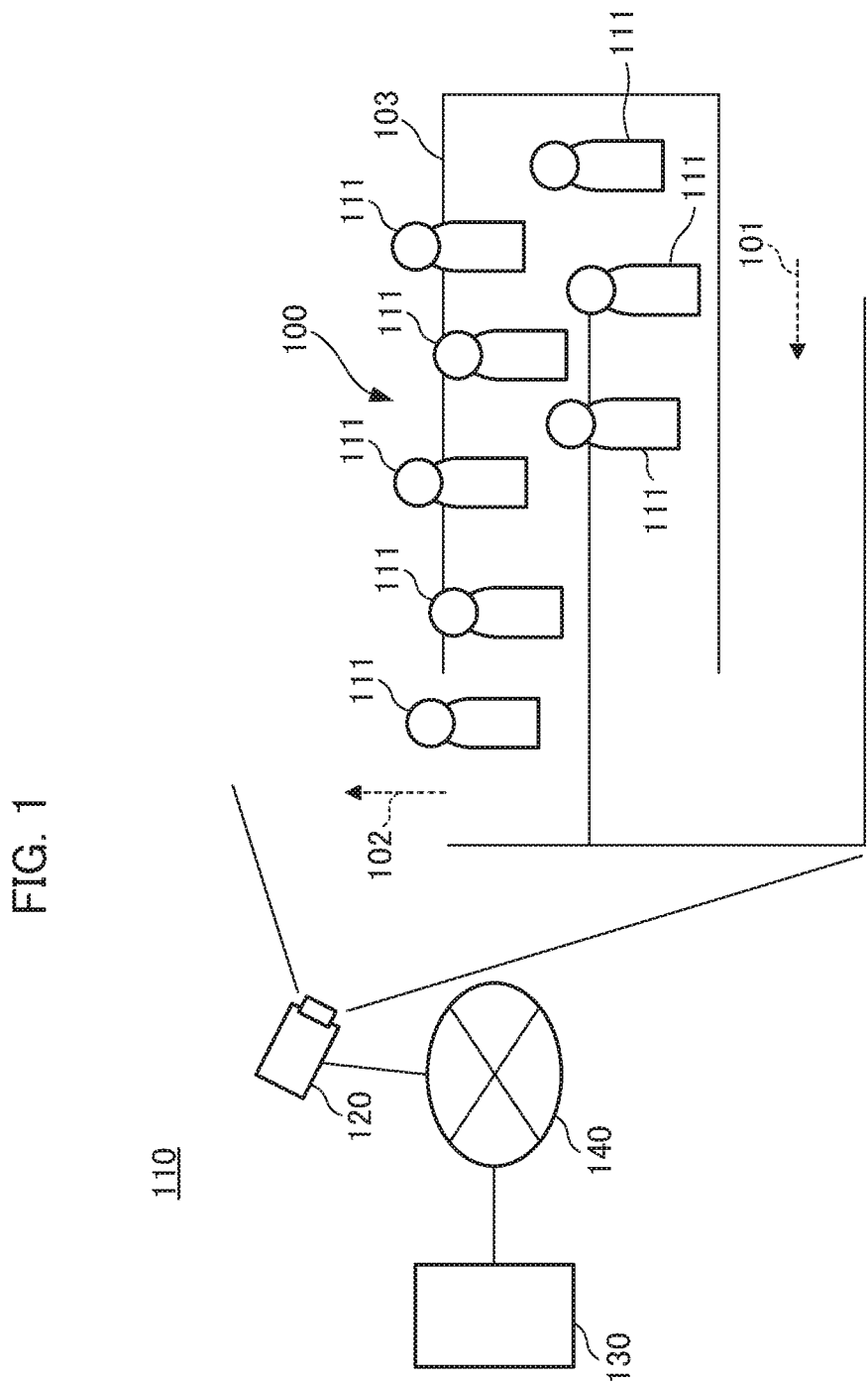
FIG. 1 is a schematic diagram showing an exemplary system configuration of an information processing system according to a first embodiment.

In the present embodiment, a process in which an information processing system obtains a waiting time in a queue will be described. FIG. 1 is a schematic diagram showing an exemplary system configuration of the information processing system according to a first embodiment. The information processing system 110 includes an imaging device 120 and an information processing device 130 connected to the imaging device 120 via a network. The information processing system 110 obtains the waiting time of people 111 lined up in a queue 100 using a first estimation process or a second estimation process. A person 111 enters the queue 100 through an entrance 101, moves along a guide 103, and exits the queue 100 through an exit 102. That is, the queue 100 extends toward the entrance 101 along the guide 103, starting from the exit 102. In the present embodiment, the time required for a person 111 to exit the queue 100 (pass through the exit 102) after entering the queue 100 (passing through the entrance 101) is referred to as a "waiting time."

The imaging device 120 is a camera that captures an image of a queue (a queue image), for example, a network camera, and at least one or more imaging devices may be provided. The imaging device 120 captures an image of people 111 in the queue, and software running on the information processing device 130 detects the people 111 in the image to count people waiting in the queue. Hereinafter, the total number of people waiting in the queue is referred to as a "queue length." Although it is desirable that the imaging device 120 capture an image of the entirety of the queue 100, it is also possible to obtain the queue length by observing parts of the queue 100 using a plurality of imaging devices 120 and combining them. Use of a plurality of imaging devices can cope with the case in which the entire queue cannot fit into the field of view of one imaging device or the case in which the shape of the queue 100 is complicated such that some thereof is hidden. Use of a plurality of imaging devices is also effective when the queue 100 extends far in the depth direction such that it is difficult to detect people depending on their locations on the screen.

The information processing device 130 is an information processing device that obtains a waiting time in a queue using the first estimation process or the second estimation process. The information processing device 130 includes, for example, a personal computer (PC), a server device, a tablet device, or the like.

Figure 2:
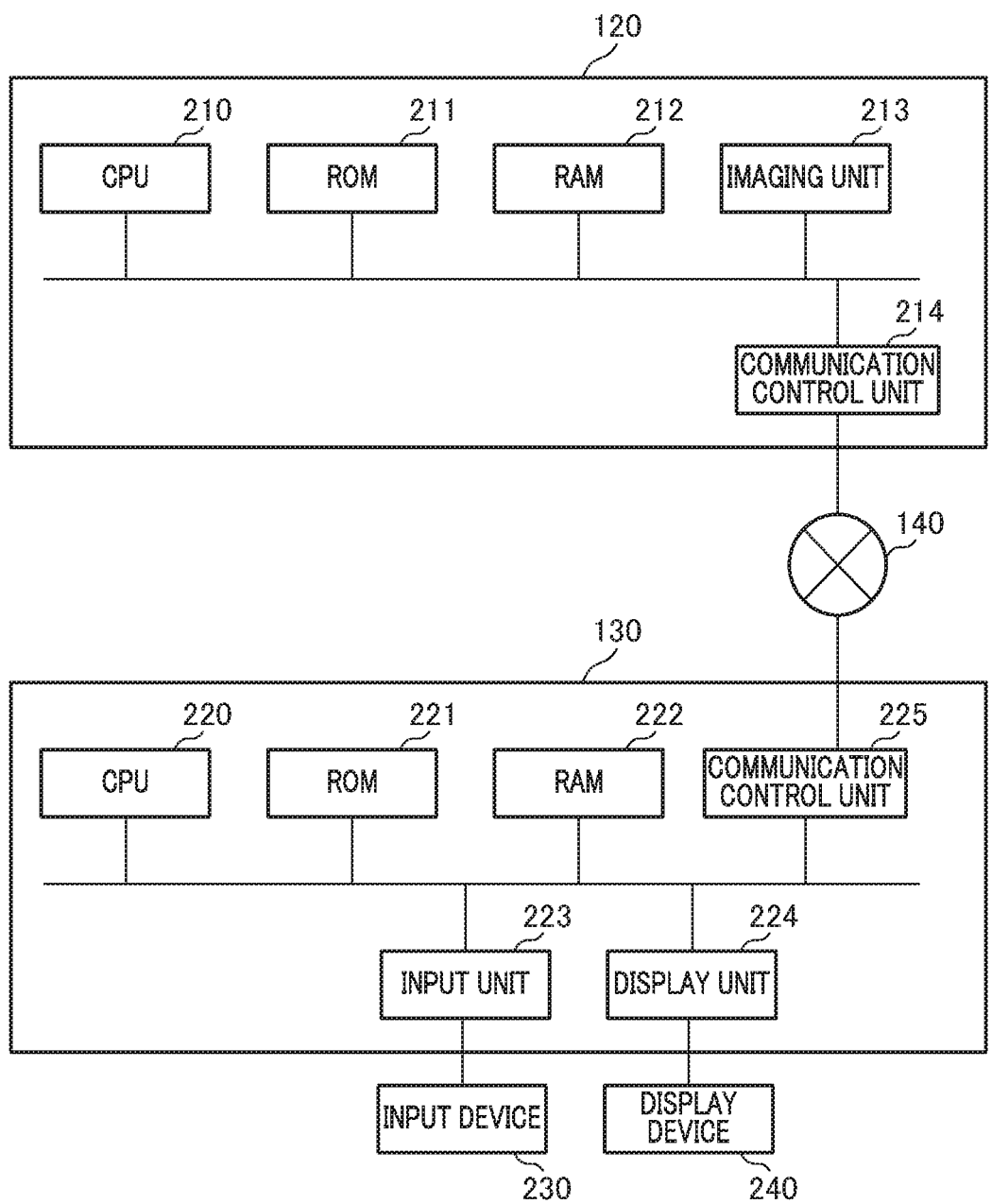
FIG. 2 is a block diagram showing an exemplary hardware configuration and the like of the information processing system according to the first embodiment.

FIG. 2 is a diagram showing an exemplary hardware configuration and the like of the information processing system 110 according to the first embodiment. The information processing device 130 and the imaging device 120 are communicatively connected via a network 140. The network 140 is a network used to connect the imaging device 120 and the information processing device 130. The network 140 includes, for example, a plurality of routers, switches, cables, and the like that satisfy a communication standard such as Ethernet (trademark). In the present embodiment, any communication standard and any scale and configuration thereof are acceptable as long as they can perform communication between the imaging device 120 and the information processing device 130. For example, the network 140 may include the Internet, a wired local area network (LAN), a wireless LAN, a wide area network (WAN), or the like.

The imaging device 120 is an imaging device such as a network camera. In the present embodiment, the information processing device 130 performs driving of the imaging device 120, acquisition of a captured image from the imaging device 120, and the like. The imaging device 120 includes a CPU 210, a ROM 211, a RAM 212, an imaging unit 213, and a communication control unit 214. The CPU 210 reads a program stored in the ROM 211 to control the processing of the imaging device 120. The RAM 212 is used as a temporary storage area such as a work area or a main memory of the CPU 210. The ROM 211 stores a boot program or the like. The imaging unit 213 has an imaging element and an optical system for a subject on the imaging element and performs imaging on the imaging element with the intersection between the optical axis of the optical system and the imaging element as an imaging center. The imaging unit 213 includes an imaging element such as a complementary metal-oxide semiconductor (CMOS) or a charged coupled device (CCD). The communication control unit 214 is used for communication with an external device such as the information processing device 130 via the network 140. The functions of the imaging device 120, the processing of the imaging device 120, and the like are realized by the CPU 210 executing processing on the basis of the program stored in the ROM 211.

The information processing device 130 has a CPU 220, a ROM 221, a RAM 222, an input unit 223, a display unit 224, and a communication control unit 225 as hardware components. The CPU 220 reads a program stored in the ROM 221 to execute various processes. The RAM 222 is used as a temporary storage area such as a work area or a main memory of the CPU 220. The ROM 221 stores a boot program or the like. The input unit 223 controls input of information to the information processing device 130 via the input device 230. The display unit 224 controls display of a screen on the display device 240. In the present embodiment, the information processing device 130 and the display device 240 are independent devices, but the display device 240 may be included in the information processing device 130. The information processing system 110 may also include a plurality of display devices 240. The communication control unit 225 connects the information processing device 130 to another device by wire or wirelessly. The CPU 220 reads the program stored in the ROM 221 to execute processing to realize functions of the information processing device 130 and processing of the information processing device 130 in a flowchart which will be described later.

Figure 3:
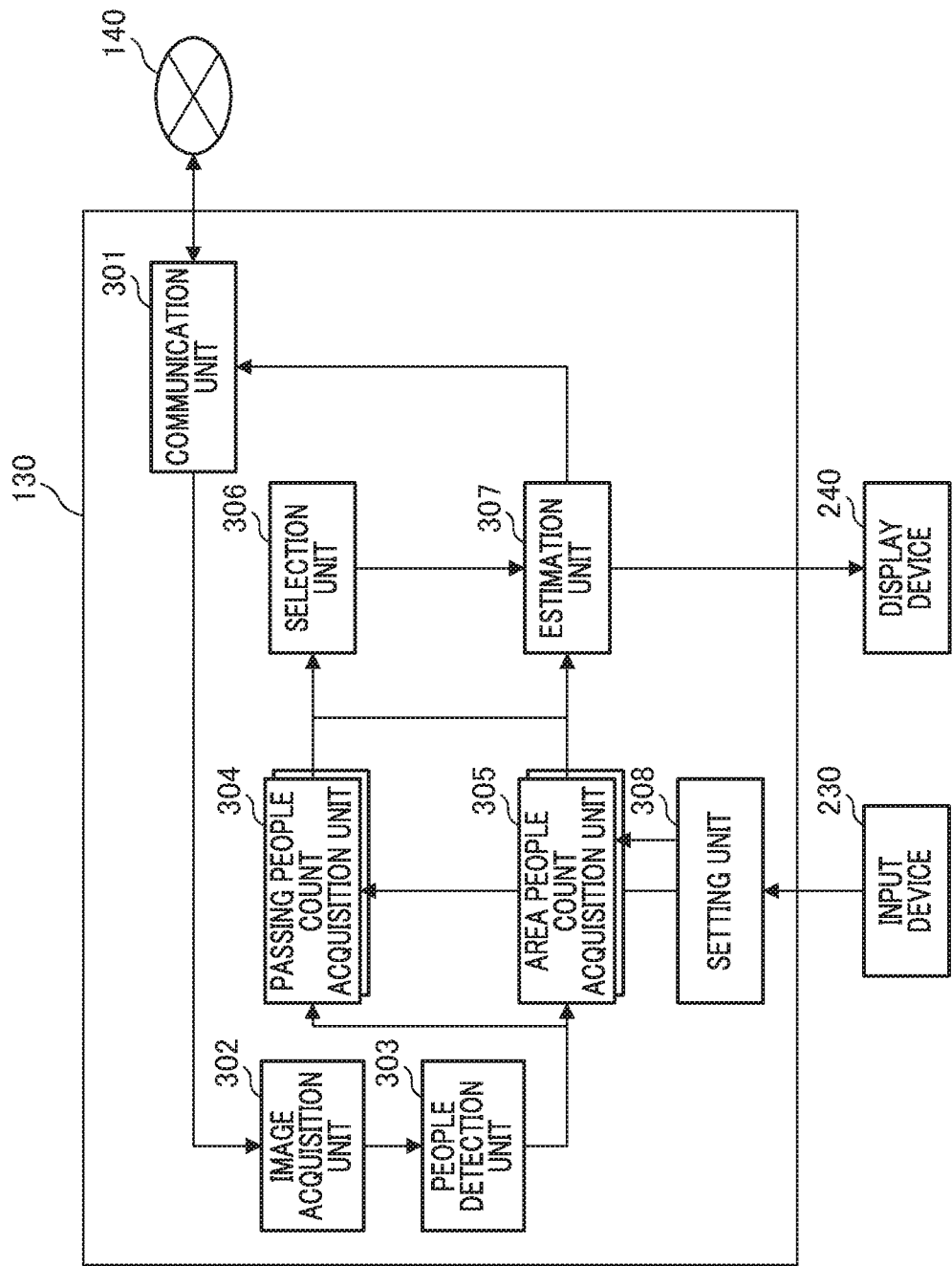
FIG. 3 is a block diagram showing an exemplary software configuration of an information processing device according to the first embodiment.

FIG. 3 is a diagram showing an exemplary software configuration of the information processing device 130 according to the first embodiment. The information processing device 130 includes a communication unit 301, an image acquisition unit 302, a people detection unit 303, a passing people count acquisition unit 304, an area people count acquisition unit 305, a setting unit 308, a selection unit 306, and an estimation unit 307 as software components. The communication unit 301 performs communication with a device such as the imaging device 120 by wire or wirelessly. The image acquisition unit 302 acquires a queue image captured by the imaging device 120 through the communication unit 301. It is to be noted that the information processing device 130 according to the present embodiment can obtain the waiting time irrespective of a specific image format or compression method. The people detection unit 303 is a detector configured to detect people and their locations in the queue image. For example, the people detection unit 303 can use, but is not limited to, a method of detecting the shapes of upper bodies of people, a method of detecting the faces of people, or a method of detecting people by learning other feature amounts.

The passing people count acquisition unit 304 counts passing people who have passed through each of the entrance 101 and the exit 102 of the queue 100 to acquire the number of passing people. The area people count acquisition unit 305 is a waiting people count acquirer configured to count people 111 present in each of the areas (queue areas) that constitute the queue 100, included in the queue image, to obtain the number of people waiting in the queue 100. The setting unit 308 is a setter configured to set the entrance 101 and the exit 102 of the queue 100. Further, the setting unit 308 sets setting areas (which will be described later) in each queue area and sets a threshold value of each setting area.

The setting of the setting unit 308 may be performed by the user using the input device 230. The selection unit 306 determines a queue area in which the tail end of the queue is located on the basis of the number of waiting people obtained by the area people count acquisition unit 305. The selection unit 306 selects the first estimation process or the second estimation process on the basis of the determination result and instructs the estimation unit 307 to perform the selected estimation process. The estimation unit 307 is an estimator configured to perform the estimation process selected by the selection unit 306 to obtain the waiting time in the queue.

Figure 4A:
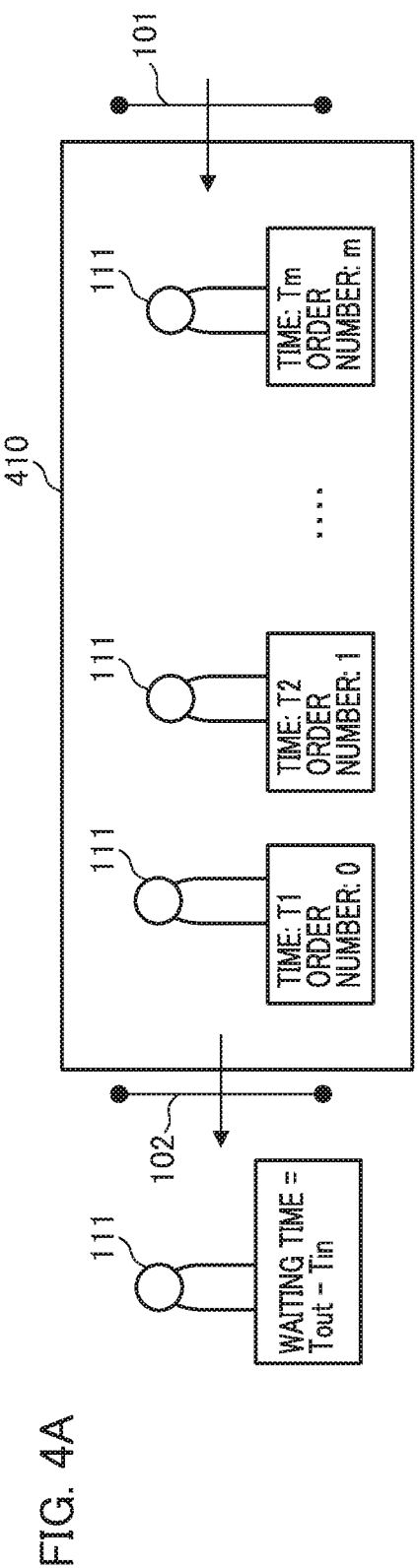
FIGS. 4A and 4B are schematic diagrams for explaining a first estimation process and a second estimation process.

Here, the first estimation process and the second estimation process will be described with reference to FIG. 4. FIG. 4 is a diagram for explaining the first estimation process and the second estimation process. FIG. 4A is a diagram for explaining the first estimation process. The first estimation process is a process for estimating a waiting time in a queue 410 in which it is possible to obtain the entry time (the time when a person passes through the entrance), the exit time (the time when the person passes through the exit), and the queue length. For the queue 410, an entry time Tin and an order number N are set for each person waiting in the queue. The entry time Tin is the time when the person 111 passes through the entrance 101 and the order number N is the number of people who are lined up before the person 111 enters the queue, which matches the queue length immediately before the person 111 enters the queue. The exit time Tout is the time when the person 111 passes through the exit 102.

For example, when passage of a person 111 through the entrance 101 is detected, an entry time Tin and an order number N of the person 111 are newly set for the person 111. Next, when passage of a person 111, who is at the head of the queue 410, through the exit is detected, the order numbers in the queue 410 advance such that the order number N of each person 111 lined up in the queue is decremented by one. When N=0, this means that the person is at the head of the queue. In this state, when passage of the person 111 through the exit is observed, the exit time Tout is set. The waiting time Tw is the difference between the exit time Tout and the entry time Tin and is obtained by the following equation.

$$Tw = Tout - Tin \quad (1)$$

Figure 4B:
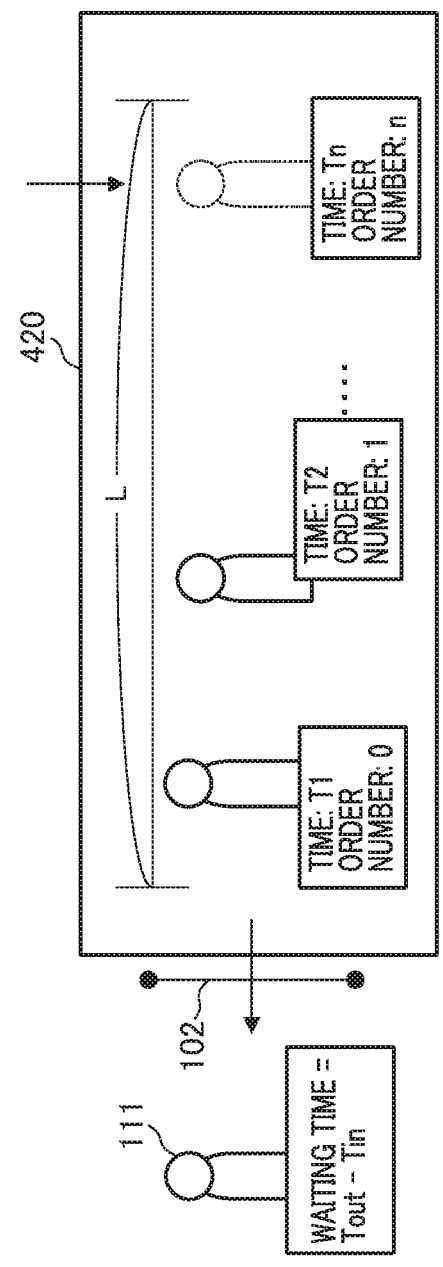

FIG. 4B is a diagram for explaining the second estimation process. The second estimation process is a process for estimating a waiting time in a queue 420 in which it is possible to obtain the exit time and the queue length. In the second estimation process, observation of the entry time based on passage through the entrance is not possible, but instead the entry of a person 111 is detected by a change in the queue length. Specifically, the queue length L is regularly observed, and the number of people who have entered the queue (the number of newly entered people) during a period from the previous observation to the current observation is obtained from the queue length L' at the previous observation and the number of exits Nout during the period from the previous observation to the current observation. The number of newly entered people Nin is obtained by the following equation.

$$N_{in} = L - L' + N_{out} \quad (2)$$

When Nin calculated by this equation is positive, the number of newly entered people corresponding to Nin is added to the queue 420. The subsequent processing is the same as the first estimation process. That is, when passage of a person 111 through the exit is observed, the waiting time of the person 111 is obtained using equation (1). At this time, an observation time when the number of newly entered people is obtained is used as the entry time Tin of equation (1). In this case, the entry time Tin of equation (1) may be, for example, a time when the queue length L is observed, or a time when the queue length L' is observed.

The following is a comparison of the first estimation process and the second estimation process. The first estimation process can add a newly entered person to the queue without delay by detecting passage of a person through the entrance. On the other hand, in the second estimation process, since a newly entered person can be added only at the timing of observing the number of people waiting in the queue (the queue length L), an error may occur between the actual entry time and the entry time Tin used to obtain the waiting time. It is possible to solve this problem by shortening the observation interval. However, in the second estimation process, the queue length L is observed. Therefore, in the case of a queue whose queue length is large such that there is a large number of waiting people, the load of people detection processing is great and it is difficult to shorten the observation interval. As a result, compared to the first estimation process, the second estimation process has an advantage that it can be applied even when the entrance of the queue cannot be clearly defined and is, on the other hand, inferior in the estimation accuracy of the waiting time.

The information processing device 130 according to the present embodiment sets an entrance and an exit of a queue in an image and obtains the waiting time using the first estimation process when the tail end of the queue does not reach the entrance. When the tail end of the queue extends outside the entrance, the information processing device 130 cannot obtain the waiting time using the first estimation process and therefore obtains the waiting time using the second estimation process.

Figure 5:
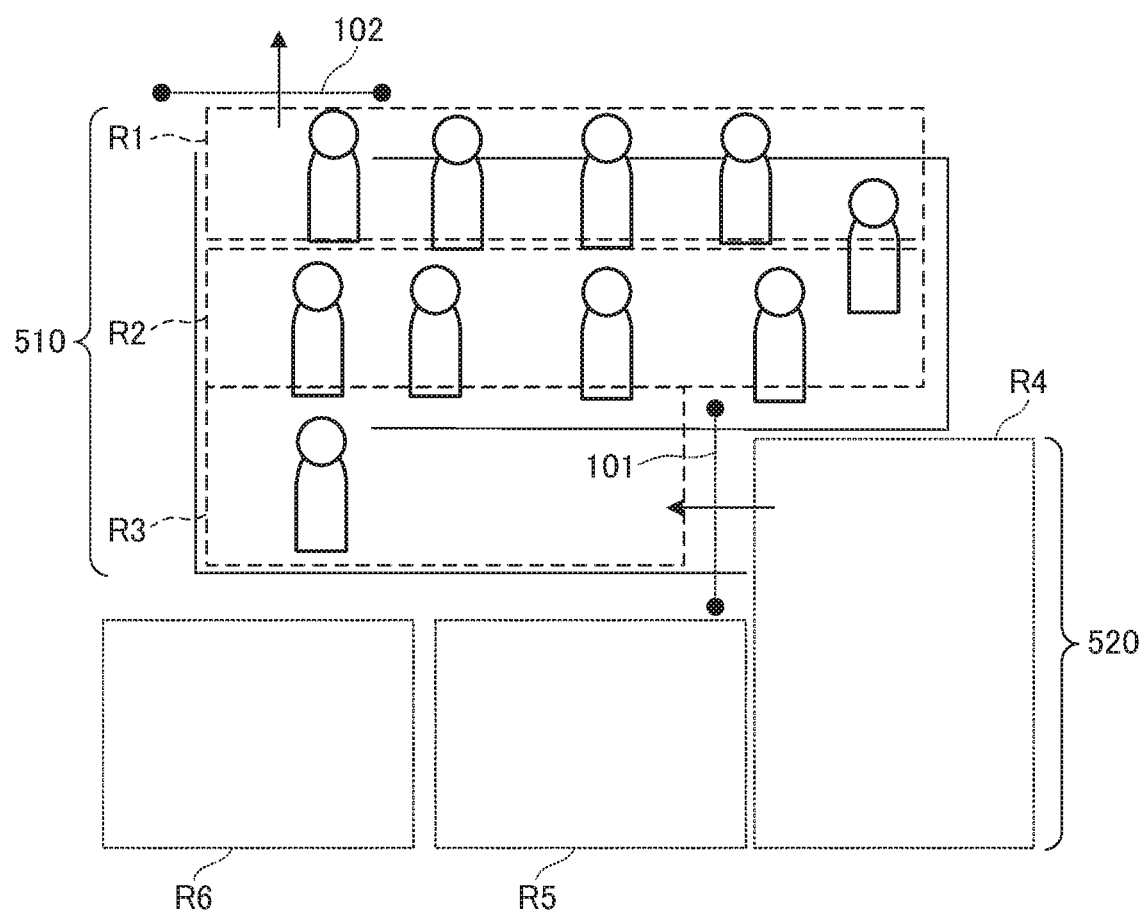
FIG. 5 is a schematic diagram showing an example of a queue image in which the tail end of a queue is inside the entrance of the queue.
Figure 6:
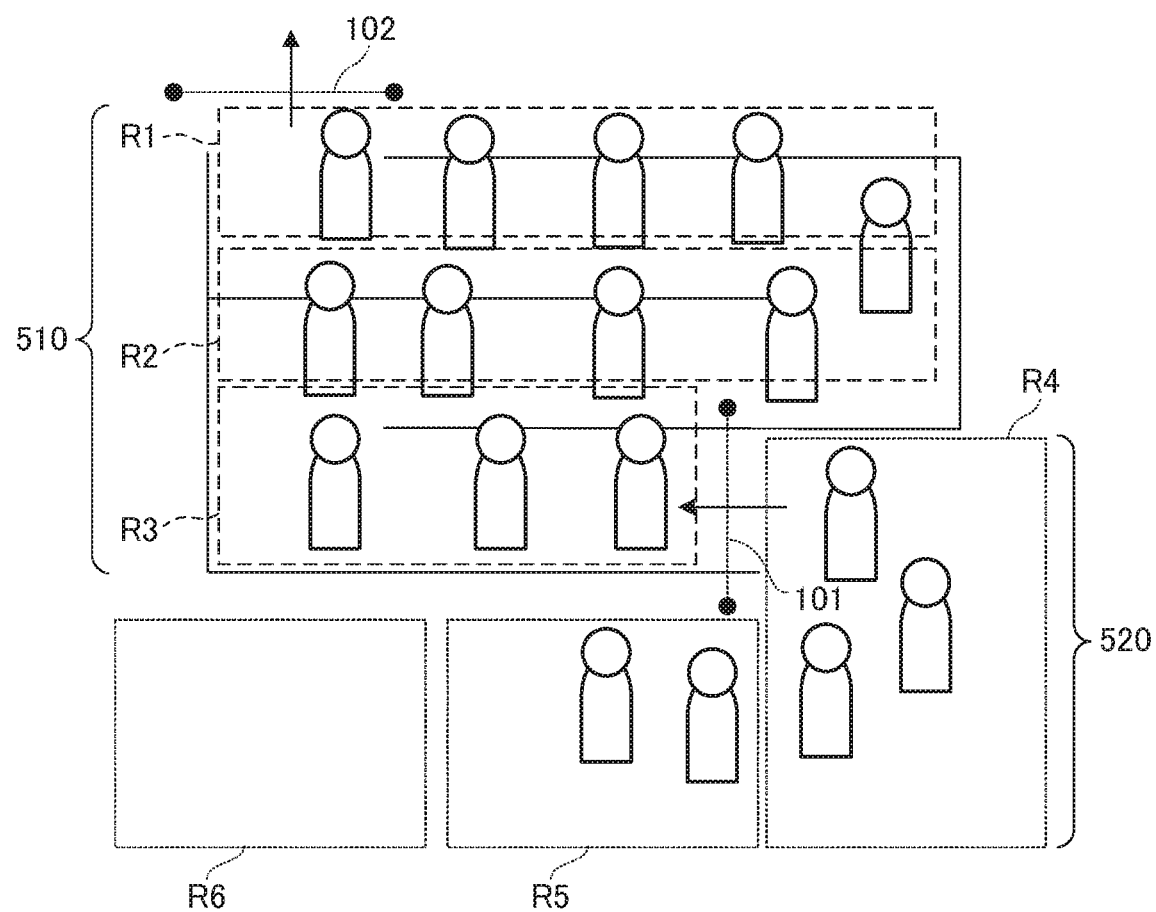
FIG. 6 is a schematic diagram showing an example of a queue image in which the tail end of the queue is outside the entrance of the queue.

FIG. 5 is a diagram showing an example of a queue image in which the tail end of a queue is inside an entrance 101 of the queue. FIG. 6 is a diagram showing an example of a queue image in which the tail end of a queue is outside an entrance 101 of the queue. The entrance 101 and the exit 102 are set in the queue image captured by the imaging device 120. The entrance 101 and the exit 102 may be set, for example, by forming virtual lines at arbitrary locations in the queue image. Accordingly, the queue image may include a first queue area 510 inside the entrance 101 and a second queue area 520 outside the entrance 101. One or a plurality of setting areas R may be further set in each of the first queue area 510 and the second queue area 520. In the present embodiment, setting areas R1 to R3 are set in the first queue area 510 and setting areas R4 to R6 are set in the second queue area 520. In the present embodiment, the setting areas R4 to R6 in the second queue area 520 may be set, for example, by previously observing or predicting areas to which the queue will extend. In FIG. 5, the setting area R3 included in the first queue area 510 corresponds to the tail end. Therefore, the information processing device 130 performs the first estimation process to obtain the waiting time. On the other hand, in FIG. 6, the setting area R5 included in the second queue area 520 is the tail end. Therefore, the information processing device 130 performs the second estimation process to obtain the waiting time.

FIG. 7 is a flowchart showing an example of processing of the information processing device according to the first embodiment. FIG. 7A is a flowchart showing an example of a main process according to the present embodiment. First, after the processing starts, in step S701, the image acquisition unit 302 acquires a queue image captured by the imaging device 120 through the communication unit 301. In step S702, the people detection unit 303 detects people in the queue image. In step S703, on the basis of the detection result of the people detection unit 303, the passing people count acquisition unit 304 counts people who have passed through each of the entrance 101 and the exit 102 of the queue. Here, people who have passed through each of the entrance and exit of the queue are counted because the information processing device 130 is set by default to first perform the first estimation process.

Next, in step S704, the area people count acquisition unit 305 counts people detected in each setting area R on the basis of the detection result of the people detection unit 303. The queue length L is the sum of the number of people detected in the setting areas R1 to R6, which is represented by the following equation.

$$L = \Sigma\, L_n | n = 1 \ldots N \qquad (3)$$

In the above equation, Ln indicates the number of people detected in a setting area Rn.

Subsequently, in step S705, the area people count acquisition unit 305 determines whether or not counting of people detected in all setting areas R has ended. If counting of people detected in all setting areas R has not ended (NO), the processing returns to step S704 and repeats steps S704 to S705. If counting of people detected in all setting areas R has ended (YES), in step S706, the selection unit 306 determines which of the first queue area and the second queue area the tail end of the queue is located in. It is to be noted that the processing of S704 and S705 is not necessarily performed every time an image is acquired and the number of times the processing is performed may be reduced to such as once every two times an image is acquired according to the load of the system.

Here, details of the tail end determination process in step S706 will be described. FIG. 7B is a flowchart showing an example of the tail end determination process according to the present embodiment. Each process in this flow may be performed by the selection unit 306. First, in step S720, the selection unit 306 temporarily sets the determination such that the tail end of the queue is located in the first queue area 510 inside the entrance 101. Next, in step S721, the selection unit 306 initializes a setting area R where the tail end of the queue is located to the setting area R1. The setting area R1 is a setting area R closest to the exit 102 of the queue. Subsequently, in step S722, the selection unit 306 determines whether or not the number of people waiting in the setting area Rn is equal to or greater than a threshold value. Here, n is a natural number. The threshold value is set by the setting unit 308. The threshold value may be set as a fixed value or may be set on the basis of a statistical amount for the number of people detected within determination areas in the latest period. An average value or a most frequent value multiplied by a predetermined constant can be used as the statistical amount. Different threshold values may be set for the setting areas R or the same threshold value may also be set. If it is determined in step S722 that the number of people waiting in the setting area Rn is less than the threshold value (NO), the selection unit 306 determines that the setting area Rn is a tail end area Ren in which the tail end of the queue is located and the processing proceeds to S725. If the number of people waiting in the setting area Rn is equal to or greater than the threshold value (YES), the selection unit 306 increments Rn by 1 in step S723.

Next, in step S724, the selection unit 306 determines whether or not the processing for all setting areas R has been completed. That is, the selection unit 306 compares Rn+1 with the maximum value Rmx of Rn. Specifically, for example, in FIG. 5, since six setting areas R are set, the maximum value Rmx is 6. Returning to FIG. 7, if the value of Rn+1 is equal to or less than the maximum value Rmx (NO), the processing returns to step S722 and repeats steps S722 to S724 since the processing for all setting areas R has not been completed. If the value of Rn+1 is greater than the maximum value Rmx (YES), the selection unit 306 determines that the setting area Rmx is the tail end area Ren since the processing for all setting areas R has been completed and the processing proceeds to S725.

In step S725, the selection unit 306 determines whether or not the value of the tail end area Ren is greater than the value of the entrance area Rin. Here, the entrance area Rin is a setting area R which is inside the entrance 101 and is adjacent to the entrance 101. Specifically, for example, in FIG. 5, Rin=3. Returning to FIG. 7, if the value of Ren is less than or equal to the value of Rin (NO), the selection unit 306 determines that the tail end of the queue is located inside the entrance 101 since the tail end of the queue is located in the first queue area 510 and the processing proceeds to S707 in FIG. 7A. On the other hand, if it is determined in step S725 that the value of Ren is greater than the value of Rin (YES), the selection unit 306 determines in step S726 that the tail end of the queue is located outside the entrance 101 since the tail end of the queue is located in the second queue area 520 and the processing similarly proceeds to S707.

Returning to FIG. 7A, in step S707, the selection unit 306 determines whether or not the tail end of the queue is outside the entrance 101 on the basis of the result of the tail end determination. If the tail end is not outside the entrance 101 (NO), the processing proceeds to S708 and the selection unit 306 selects the first estimation process and instructs the estimation unit 307 to perform the first estimation process. If the tail end is outside the entrance 101 (YES), the processing proceeds to S709 and the selection unit 306 selects the second estimation process and instructs the estimation unit 307 to perform the second estimation process. Next, in step S710, the estimation unit 307 performs the estimation process selected by the selection unit 306 and outputs the result. In step S711, if a termination instruction has been issued, the processing is terminated. If no termination instruction has been issued, the processing returns to step S701 to continue the processing.

According to the above, it is possible to switch the methods of waiting time estimation processing depending on whether the tail end of the queue is located inside or outside the entrance. As a result, it is possible to improve the estimation accuracy of the waiting time in the queue regardless of the state of the queue.

Although the present embodiment has been described with regard to the case in which one imaging device is used, images of the exit and the entrance of the queue may be obtained through different imaging devices. Further, a plurality of setting areas may be set in images obtained through different imaging devices. In this case, it is possible to adopt a parallel processing configuration such that the processes for acquiring the number of waiting people of the queue in steps 703 and 704 are executed on processes, tasks or threads of different implementations and the results are combined in a main process, task, or thread.

Further, in the present embodiment, the entrance and exit of the queue are defined by imaginary lines in the queue image, but the present invention is not limited to this. For example, a detection device such as a passage sensor based on infrared rays may be provided and the entrance and the exit may be set by connecting this detection device and the information processing device.

Second Embodiment

Next, a second embodiment will be described. Matters not mentioned in the second embodiment follow the embodiment described above. In the second embodiment, if the tail end of the queue is located outside the entrance, the entire queue is divided into two queues: a queue located in the first queue area and a queue located in the second queue area. Then, estimation results obtained with the queues are combined to estimate the total waiting time.

First, division of a queue according to the present embodiment will be described with reference to FIG. 6 of the first embodiment. In FIG. 6, the tail end of the queue is located in the second queue area 520. At this time, the queue located in the setting areas R1 to R3 included in the first queue area 510 is set as a first queue and the queue located in the setting areas R4 to R6 included in the second queue area 520 is set as a second queue. In this way, it is possible to perform the first estimation process on the first queue with the entrance 101 as the entrance of the first queue and the exit 102 as the exit of the first queue. On the other hand, the entrance of the queue cannot be defined in the second queue, and the second estimation process is performed by setting the entrance 101 as the exit of the second queue.

Figure 8:
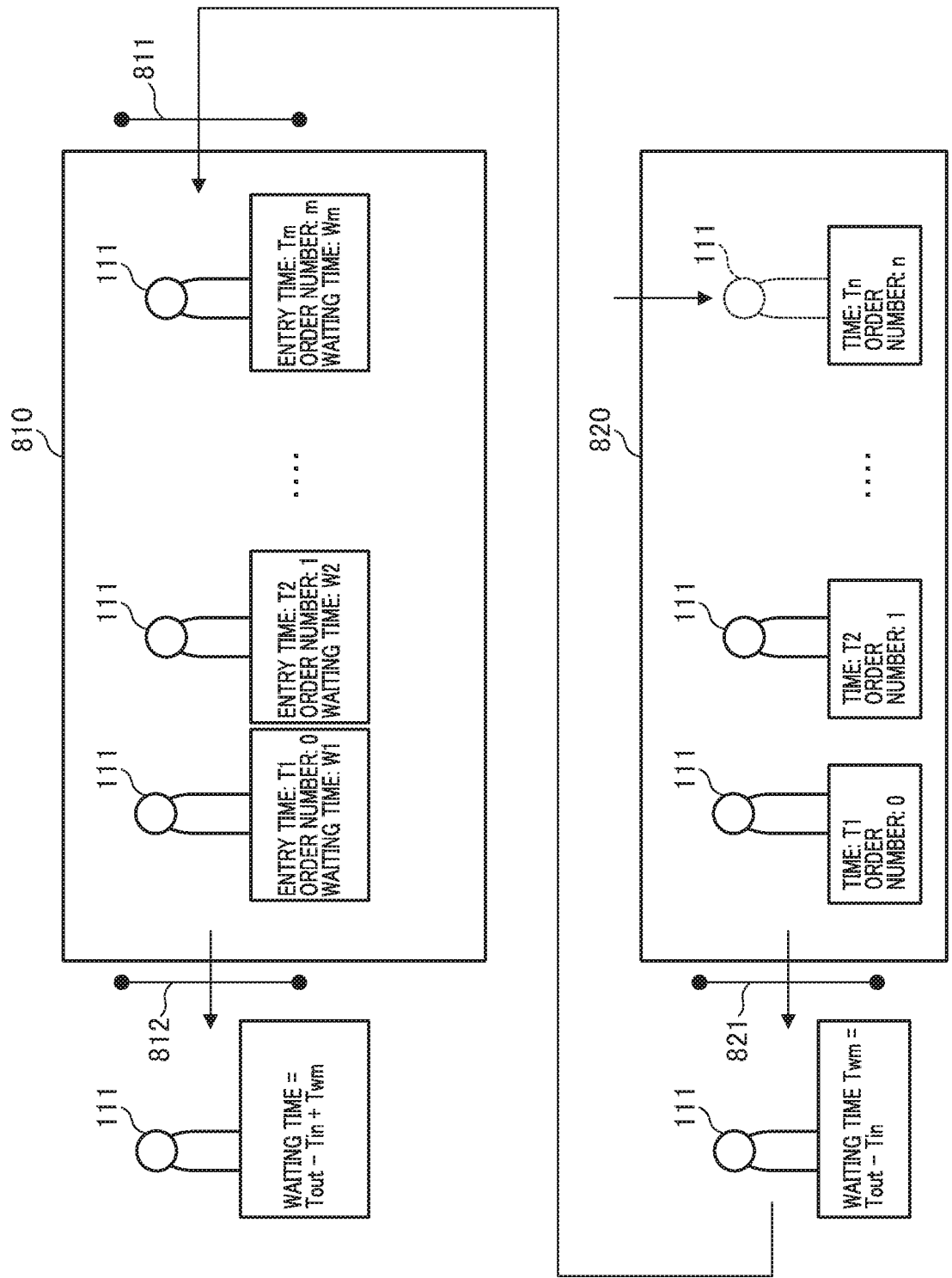
FIG. 8 is a schematic diagram for explaining an estimation process according to a second embodiment.

FIG. 8 is a diagram for explaining an estimation process according to the second embodiment. The first estimation process and the second estimation process method are the same as those of the first embodiment, but the total number of waiting people is the sum of the respective numbers of waiting people of a first queue 810 and a second queue 820. In addition, in the present embodiment, it can be said that a person 111 passing through an exit 821 of the second queue 820 is, at the same time, a person 111 passing through an entrance 811 of the first queue 810. Therefore, when passage through the entrance 811 of the first queue 810 is detected, information on a waiting time Twm of the second queue 820, in addition to an entry time to the first queue 810, is set for the person 111. When the person 111 passes through an exit 812 of the first queue 810, the waiting time of the second queue 820 is added to the waiting time of the first queue 810 to obtain a waiting time Tw. That is, the waiting time Tw according to the estimation process of the present embodiment can be expressed by the following equation.

$$Tw = Tout - Tin + Twm \quad (4)$$

Figure 9:
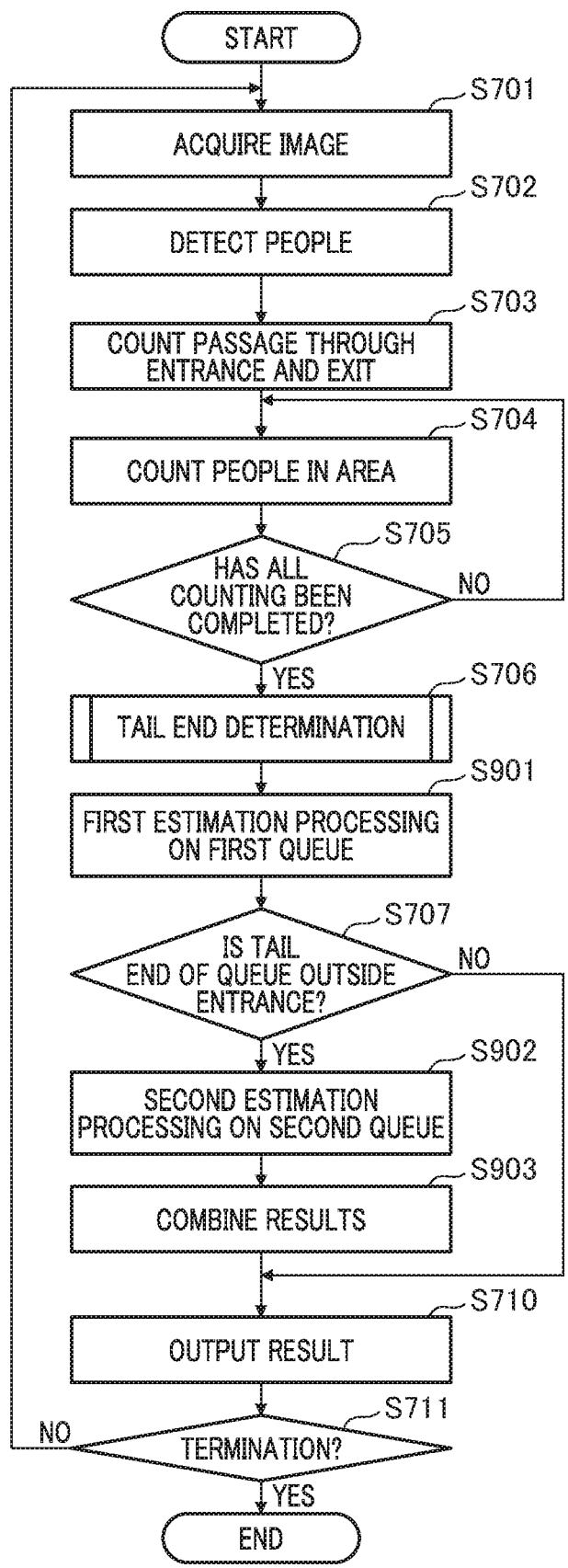
FIG. 9 is a flowchart showing an exemplary main process according to the second embodiment.

FIG. 9 is a flowchart showing an example of a main process according to the second embodiment. The same reference numerals as those in FIG. 7 are assigned to the same steps as those in the flowchart shown in FIG. 7 and descriptions thereof will be omitted. In step S706, the same tail end determination of the queue is performed. However, regardless of the result, in step S901, the selection unit 306 selects the first estimation process for the first queue 810 and instructs the estimation unit 307 to perform the first estimation process on the first queue 810. The estimation unit 307 performs the first estimation process on the first queue 810. Next, if the selection unit 306 determines in step S707 that the tail end of the queue is outside the entrance (YES), the processing proceeds to step S902. In step S902, the selection unit 306 selects the second estimation process for the second queue 820 and instructs the estimation unit 307 to perform the second estimation process on the second queue 820. The estimation unit 307 performs the second estimation process on the second queue 820. Thereafter, in step S903, the estimation unit 307 combines the result of the first estimation processing on the first queue 810 and the result of the second estimation processing on the second queue 820. Specifically, the estimation unit 307 adds the waiting time of the second queue 820 to the waiting time of the first queue 810 to output the waiting time estimation result. If the selection unit 306 determines in step S707 that the tail end of the queue is not outside the entrance (NO), the estimation unit 307 outputs the result of the first estimation processing on the first queue 810.

As a result of the above processing, even if a queue with an entrance and an exit extends beyond the entrance, it is possible to estimate the waiting time in the queue without lowering the accuracy.

Although embodiments of the present invention have been described above, the present invention is not limited to these embodiments and various modifications are possible within the scope of the gist thereof.

The present invention can also be realized through the processes of providing a system or apparatus with a program that implements one or more of the functions of the above embodiments via a network or a storage medium and causing one or more processors in a computer of the system or apparatus to read and execute the program. The present invention can also be realized by a circuit (for example, an ASIC) that implements one or more functions. Further, by storing the processing of the present invention in the ROM 211 of the imaging device 120, the imaging device 120 can execute the functions of the present invention. In this case, the processing of the above flowcharts by the imaging device 120 is realized by the CPU 210 of the imaging device 120 executing the processing on the basis of a program stored in the ROM 211. Further, in this case, the imaging device 120 outputs the obtained waiting time to an external device such as the information processing device through the communication control unit 214 (which is an output unit).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-103820, filed May 30, 2018, which is hereby incorporated by reference wherein in its entirety.

What is claimed is:

1. An information processing device comprising a computer executing instructions that, when executed by the computer, cause the computer to function as:
   an acquisition unit configured to acquire an image of a queue and to acquire a number of persons in the queue;
   a setting unit configured to: set, in the image, a first line corresponding to a position through which the person passes when entering a first area including at least a head of the queue; and set, in the image, a second line corresponding to the head of the queue and corresponding to a position through which the person passes when exiting from the first area;
   a first determination unit configured to determine that a person has passed through the first line;
   a second determination unit configured to determine that a person has passed through the second line; and
   a calculation unit configured to perform a first calculation process for calculating a waiting time of a subject person in the queue on the basis of a time when the subject person passed through the first line and a time when the subject person passed through the second line, or to perform a second calculation process for calculating the waiting time of the subject person in the queue on the basis of a time when the number of people in the queue including the subject person is acquired by the acquisition unit and a time when the subject person passed through the second line;
a third determination unit configured to determine whether or not a tail end of the queue is closer to the head of the queue than a position of the first line; and
an output unit configured to output the waiting time calculated by the calculation unit,
wherein the calculation unit is configured to switch from performing one of the first and second calculation processes to the other of the first and second calculation processes in accordance with the determination of the third determination unit as to whether or not the tail end of the queue is closer to the head of the queue than a position of the first line.

2. The information processing device according to claim 1,
wherein the calculation unit is configured to perform the first calculation process if the third determination unit has determined that the position of the tail end of the queue is closer to the head of the queue than the position of the first line, and to perform the second calculation process if the third determination unit has determined that the position of the tail end of the queue is not closer to the head of the queue than the position of the first line.

3. The information processing device according to claim 2, wherein the image includes the first area and a second area which is outside the first area and in which the queue is formed, and
the third determination unit is configured to determine that the position of the tail end of the queue is closer to the head of the queue than the position of the first line, if the position of the tail end of the queue is located in the first area, and to determine that the position of the tail end of the queue is not closer to the head of the queue than the position of the first line, if the position of the tail end of the queue is located in the second area.

4. The information processing device according to claim 3, wherein the setting unit is configured to set one or a plurality of setting areas in the first area and the second area,
wherein the acquisition unit is configured to acquire the number of people in each of the one or plurality of setting areas, and
the third determination unit is configured to determine that the position of the tail end of the queue is located in the first area if a setting area with a smaller number of people than a threshold value is included in the first area and to determine that the position of the tail end of the queue is located in the second area if a setting area with a smaller number of people than the threshold value is included in the second area.

5. The information processing device according to claim 4, wherein the setting unit sets the threshold value for each of the plurality of setting areas.

6. The information processing device according to claim 1, wherein the time when the subject person passed through the second line is a time when the number of people passing through the second line after the subject person is added to the queue reaches the number of people acquired by the acquisition unit after the subject person is added to the queue.

7. An information processing method performed by an information processing device, the information processing method comprising:
an acquisition process including acquiring, by an acquisition unit, an image of a queue and a number of persons in the queue;
setting, by a setting unit, in the image, a first line corresponding to a position through which the person passes when entering a first area including at least a head of the queue, and a second line corresponding to the head of the queue and corresponding to a position through which the person passes when exiting from the first area;
a first determination process including determining, by a first determination unit, that a person has passed through the first line;
a second determination process including determining, by a second determination unit, that a person has passed through the second line; and
a calculation process including performing, by a calculation unit, a first calculation process for calculating a waiting time of a subject person in the queue on the basis of a time when the subject person passed through the first line and a time when the subject person passed through the second line, or a second calculation process for calculating the waiting time of the subject person in the queue on the basis of a time when the number of people in the queue including the subject person is acquired in the acquisition process and a time when the subject person passed through the second line;
a third determination process including determining, by a third determination unit, whether or not a tail end of the queue is closer to the head of the queue than a position of the first line; and
an outputting process including outputting, by an output unit, the waiting time calculated by the calculation unit,
wherein the calculation process includes switching, by the calculation unit, from performing one of the first and second calculation processes to the other of the first and second calculation processes in accordance with the determination of the third determination unit as to whether or not the tail end of the queue is closer to the head of the queue than a position of the first line.

8. A non-transitory computer readable storage medium storing a program for causing a computer to execute an information processing method, the information processing method comprising:
an acquisition process acquiring, by an acquisition unit, an image of a queue and a number of persons in the queue;
setting, by a setting unit, in the image, a first line corresponding to a position through which the person passes when entering a first area including at least a head of the queue, and a second line corresponding to the head of the queue and corresponding to a position through which the person passes when exiting from the first area;
a first determination process including determining, by a first determination unit, that a person has passed through the first line;
a second determination process including determining, by a second determination unit, that a person has passed through the second line;
a calculation process including performing, by a calculation unit, a first calculation process for calculating a waiting time of a subject person in the queue on the basis of a time when the subject person passed through the first line and a time when the subject person passed through the second line, or a second calculation process for calculating the waiting time of the subject person in the queue on the basis of a time when the number of people in the queue including the subject person is acquired in the acquisition process and a time when the subject person passed through the second line;

a third determination process including determining, by a third determination unit, whether or not a tail end of the queue is closer to the head of the queue than a position of the first line; and an outputting process including outputting, by an output unit, the waiting time calculated by the calculation unit, wherein the calculation process includes switching, by the calculation unit, from performing one of the first and second calculation processes to the other of the first and second calculation processes in accordance with the determination of the third determination unit as to whether or not the tail end of the queue is closer to the head of the queue than a position of the first line.

* * * * *